(12) United States Patent
Nagaoka

(10) Patent No.: US 6,777,084 B2
(45) Date of Patent: Aug. 17, 2004

(54) INJECTION MOLDING METHOD, AND MOLDED PRODUCT OBTAINED FROM THE METHOD

(75) Inventor: Tsutomu Nagaoka, Tokyo (JP)

(73) Assignee: Kabushiki Kaisha Kobe Seiko Sho (Kobe Steel, Ltd.), Kobe (JP)

( * ) Notice: Subject to any disclaimer, the term of this patent is extended or adjusted under 35 U.S.C. 154(b) by 369 days.

(21) Appl. No.: 10/023,710

(22) Filed: Dec. 21, 2001

(65) Prior Publication Data
US 2002/0125597 A1 Sep. 12, 2002

(30) Foreign Application Priority Data
Dec. 25, 2000 (JP) ........................................ 2000-392385

(51) Int. Cl.$^7$ .......................... D02G 3/00; B32B 33/00; D01D 5/34; B29C 47/06
(52) U.S. Cl. .................. 428/373; 428/375; 264/171.11; 264/172.15; 264/173.16
(58) Field of Search ................................ 428/373, 375; 264/171.11, 172.15, 173.16

(56) References Cited

U.S. PATENT DOCUMENTS 6,074,190 A 6/2000 Nagaoka et al.
6,129,870 A * 10/2000 Hettinga .................... 264/40.5
6,555,041 B1 * 4/2003 Nagaoka et al. ............ 264/255

FOREIGN PATENT DOCUMENTS

EP 0 191 623 8/1986
EP 0 920 968 6/1999

OTHER PUBLICATIONS

Patent Abstracts of Japan, JP 6-226798, Aug. 16, 1994.
Patent Abstracts of Japan, JP 1-049612, Feb. 27, 1989.

* cited by examiner

Primary Examiner—Stephen J. Lechert, Jr.
(74) Attorney, Agent, or Firm—Oblon, Spivak, McClelland, Maier & Neustadt, P.C.

(57) ABSTRACT

A molded product consisting of a skin layer and a core layer is obtained by injecting a skin layer resin and a core layer resin from a skin injection unit 13 and a core injection unit 12 into metal molds 8, 9, respectively. The skin layer resin injection pressure by the skin injection unit 13 and the core layer resin injection pressure by the core injection unit 12 are controlled in such a manner that a volumetrically reduced quantity at the time of cooling and solidifying the skin layer resin is compensated so as not to generate defects such as hollows and the like in the molded product. It is characterized in that the state the core dwelling pressure is higher than the skin dwelling pressure over a predetermined length of time.

11 Claims, 6 Drawing Sheets

INJECTION MOLDING METHOD, AND MOLDED PRODUCT OBTAINED FROM THE METHOD

BACKGROUND OF THE INVENTION

1. Field of the Invention

The present invention relates to an injection molding method for manufacturing a molded product by injecting resin from a plurality of injection units.

2. Description of the Related Art

Conventionally, a molded product obtained from injection molding is manufactured by press-fitting resin in molten state into a cavity and then cooling and solidifying it, but if the inner part of the molded product is placed in the state of negative pressure due to the volumetric reduction of the resin at the time of solidification, sink marks, which are dimples formed because the skin part is drawn into the inner part, are produced. Therefore, in order to prevent this problem, various injection molding methods have been practiced from the past for preventing the inner part of the molded product from being placed under a negative pressure at the time of solidification.

In particular, following methods have been practiced: (1) a method wherein a predetermined amount of resin is injected from an injection unit into a cavity and then the resin is additionally injected again from the injection unit, whereby the volumetrically reduced quantity at the time of solidification may be compensated, (2) a method wherein resin is injected from the injection unit into the cavity and then gas such as air, nitrogen, or the like is introduced into the portions at which sink marks may be easily formed, and (3) a method wherein foaming agent is added to resin, whereby the volumetrically reduced quantity at the time of solidification is compensated with the expansion of the foaming agent.

However, with the first method in which the resin is added as in the above prior art, the added amount is apt to be surplus because a small amount of resin is added using an injection unit that is set to inject a large amount of resin into a cavity. A problem is also caused in that if the added amount is surplus, the weight of molded product is increased more than is necessary and the cost of material is increased because the amount of resin to be used is increased. Furthermore, another problem will be caused in that because the pressure of resin is increased as a whole, the metal mold may be opened whereby badness of molding or burr may be produced or the metal mold becomes unable to be used within a short time.

Also, with the second method in which gas is introduced into the predetermined portions in the cavity, there is a problem in that it is required to provide a gas introduction path for leading the gas into the predetermined portions, whereby the cost of the metal mold arrangement can be increased or sometimes it is impossible to provide such a gas introduction path in the metal mold arrangement in accordance with the shape of molded products. Furthermore, with this method, there are problems in that the strength of molded products is apt to be deteriorated because hollows are produced within the molded products due to the gas, and in that shapes of the molded products and usable resins can be limited because the gas can be introduced into even an unnecessary portion in the case of a soft resin such as a polypropylene resin or the like.

Still yet, with the third method in which a foaming agent is added into the resin, there are problems in that the cost of material is increased due to the foaming agent while the strength of molded products is decreased due to hollows formed within the molded products by the foaming agent, and in that gas traces (small mark) are produced on the surfaces of the molded products.

Therefore, it is an object of the present invention to provide an injection molding method and an injection molding apparatus, which can precisely perform compensation of resin for the volumetrically reduced quantity without supplying gas or adding foaming agent, which causes various problems as, explained in the above.

SUMMARY OF THE INVENTION

In order to achieve the above object, the present invention provides an injection molding method for obtaining a molded product consisting of a skin layer and a core layer by injecting a skin layer resin and a core layer resin from a skin injection unit and a core injection unit, respectively, into a metal mold, comprising the steps of:

injecting said skin layer resin from said skin injection unit into said metal mold, wherein the value of injection pressure is a predetermined value of the initial skin layer injection pressure;

injecting said core layer resin from said core injection unit into said metal mold after a predetermined length of time is passed from the start of injection of said skin layer resin, wherein the value of injection pressure is a predetermined value of the initial core layer injection pressure and said initial core layer injection pressure value is greater than the value of said initial skin layer injection pressure;

changing said skin layer resin injection pressure to a predetermined value of the skin layer dwelling pressure after a predetermined length of time is passed from the start of injection of said core layer resin, wherein the value of said skin layer dwelling pressure is smaller than the value of said initial skin layer injection pressure;

changing said core layer resin injection pressure to a predetermined value of the core layer resin dwelling pressure after a predetermined length of time is passed from the time that the said skin layer resin injection pressure is changed to the value of said skin layer dwelling pressure, wherein the said core layer dwelling pressure is smaller than the value of said initial core layer injection pressure and greater than the value of said skin layer dwelling pressure; and maintaining the state that the value of said core layer dwelling pressure is greater than the value of said skin layer dwelling pressure over a predetermined length of time.

According to the above constitution, when the skin layer resin for forming the skin layer is cooled and solidified from the surface side to the inner side and thus a volumetric reduction is induced, the core layer resin injected to the core layer disposed inside the skin layer is existent in a pressure higher than the pressure of the skin layer resin so as to compensate the volumetrically reduced quantity, whereby the drop of internal pressure induced by the volumetric reduction of skin layer resin will be prevented. Due to this, when the skin layer resin and the core layer resin are cooled and solidified, and become a molded product, neither sink marks are produced on the surface of the molded product nor hollows are formed in the molded product.

In the above injection molding method, the value of said initial core layer injection pressure is set to be larger than the value of said initial skin layer injection pressure so as to be sufficient to compensate the volumetrically reduced quantity of said skin layer resin at the time of solidification of said skin layer resin. Alternatively, the value of said core layer dwelling pressure may be set to be larger than the value of said skin layer dwelling pressure so as to be sufficient to compensate the volumetrically reduced quantity at the time of cooling and solidification of said skin layer resin.

Moreover, in the above injection molding method, the value of said initial core layer injection pressure and the value of said core layer dwelling pressure are set to be larger than the value of said initial skin layer injection pressure value and the value of said skin layer dwelling pressure, respectively, so that the volumetrically reduced quantity at the time of cooling and solidification of said skin layer resin can be sufficiently compensated. According to this, it is possible to more certainly prevent sink marks and hollows of the molded product.

Here, it is very suitable that said core layer dwelling pressure is developed by the injection pressure of said core injection unit. According to this, it is not required to perform a complex treatment such as handling the metal mold or the like.

Furthermore, in the above injection molding method, it is very suitable that the injection capacity of said core injection unit is equal to or less than the injection capacity of said skin injection unit.

According to this, it is possible to finely adjust the amount of the core layer resin to be injected, whereby the core layer resin can be precisely injected in a required minimum amount which will not generate sink marks nor hollows of molded product. Therefore, it is possible to suppress the increase of excessive weight of molded product and the increase of cost caused thereby.

In addition, in the above injection molding method, it is very suitable that the amount of said core layer resin to be injected is smaller than the amount of said skin layer resin to be injected.

According to this, the excessive use of the core layer resin which leads to the increase of weight and cost can be sufficiently suppressed.

In addition, in the above injection molding method, it is possible that the value of said skin resin injection pressure by said skin injection unit may be reduced step by step after the start of injection of said core layer resin from said core injection unit into said metal mold.

Also, in the above injection molding method, it is possible that the injection pressure value of skin resin by said skin injection unit may be set to a pressure value smaller than the value of said skin layer dwelling pressure before changed to the value of said skin layer dwelling pressure.

Further, in the above injection molding method, it is possible that at least one of the value of said core layer resin injection pressure and the value of said skin layer resin injection pressure may be reduced step by step after the state that the value of said core layer dwelling pressure is larger than the value of said skin layer dwelling pressure is maintained over a predetermined length of time.

Still, in the above injection molding method, it is very suitable that said core layer resin and said skin layer resin are homogeneous or have compatibility while being heterogeneous. According to this, the core layer and the skin layer can be sufficiently adhered, thereby increasing the strength of molded product.

Still yet, the present invention provides an injection molding apparatus for obtaining a molded product consisting of a skin layer and a core layer comprising:

a metal mold;

a skin injection unit for injecting a skin layer resin into said metal mold;

a core injection unit for injecting a core layer resin into said metal mold, wherein the injection capacity of said core injection unit is equal to or less than the injection capacity of said skin injection unit;

a skin layer resin injection pressure control means for controlling the magnitude of the injection pressure of said skin layer resin;

a core layer resin injection pressure control means for controlling the magnitude of the injection pressure of said core layer resin; and an injection control device for controlling said skin injection unit, said core injection unit, said core layer resin injection pressure control means, and said skin layer resin injection pressure control means to perform a injection molding method as defined above.

By using the apparatus having the above constitution, it is possible to cheaply produce a molded product without generating sink marks or hollows.

Furthermore, the present invention provides a molded product formed by the above injection molding method. Such a molded product is suitable for transparent components of polycarbonate, acryl resin and the like, or components that require high flatness such as compact disc (CD), in addition to being applicable to components for automobile.

DESCRIPTION OF THE PREFERRED EMBODIMENTS

Herein below, an embodiment of the present invention will be described with reference to FIGS. 1 to 6.

Figure 2:
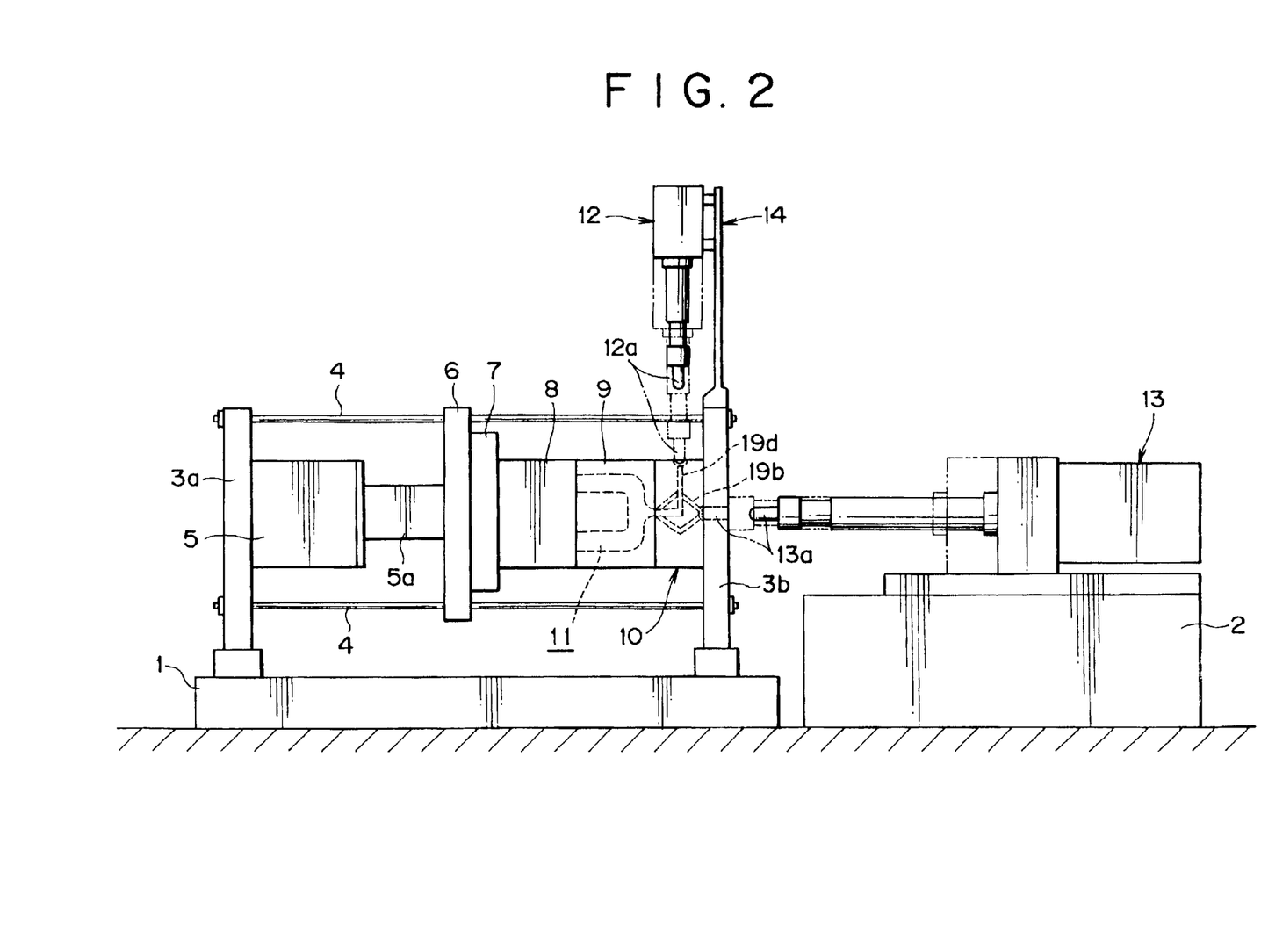
FIG. 2 is a schematic structural view showing a multi-layer injection molding apparatus.

An injection molding apparatus according to this embodiment is constructed as a multi-layer injection molding machine as shown in FIG. 2. The multi-layer molding machine has a clamping base 1 and an injection unit loading table 2. On both ends of the clamping base 1, support members 3a, 3b are longitudinally provided, and between the support members 3a, 3b, bar-shaped guide members 4, . . . are transversely provided at each corner. On one support member 3a positioned in the right side of the drawing, a metal mold opening and closing cylinder 5 is provided in such a manner that a cylinder rod 5a is opposed to the other support member 3b, and a guide engaging member 6 is provided on the tip end of the cylinder rod 5a. Said guide members 4 pass through each corner of the guide engaging member 6 to be slidable, and the guide engaging member 6 is moved along the guide members 4, thereby regulating the advancing and retreating directions of the cylinder rod 5a of the metal mold opening and closing cylinder 5.

A movable metal mold 8 is provided on the guide engaging member 6 through a mold board 7. A stationary metal mold 9 connected to the back surface of an injection unit connecting device 10 is opposed to the movable metal mold 8. The front surface circumferential part of the injection unit connecting device 10 is fixed to the other support member 3*b*. Thus, the stationary metal mold 9 is placed in the state fixed to the other support member 3*b* through the injection unit connecting device 10, and the movable metal mold 8 is brought into contact with the stationary metal mold 9 and clamped therewith by the metal mold opening and closing cylinder 5, whereby the movable metal mold 8 and the stationary metal mold 9 form a cavity part 11 in the inner side thereof.

Two kinds of resins that comprise a core layer for forming the inner part of a molded product and a skin layer for covering the core layer are simultaneously press-fitted into the cavity part 11 through the injection unit connecting device 10.

In addition, a resin same with the skin layer and colored identically to the skin layer, a resin same with the skin layer and colored differently from the skin layer, or a resin different from that of the skin layer may be used for the core layer. Furthermore, considering the cost down and the recycling characteristics of products, it is possible to use a resin obtained by pulverizing the wasted thermosetting plastics or inferior goods of thermosetting resin products generated in the course of production process, mixing the pulverized materials with a thermoplastic resin, and palletizing the mixture to have a predetermined particle size for the core layer. The wasted thermosetting resin may include a fiber reinforced thermosetting resin, an FRP (Fiber Reinforced Plastic) resin containing unsaturated polyester, glass fiber, filler (calcium carbonate, talc or the like) or the like, a thermosetting urethane resin, and etc.

Figure 1:
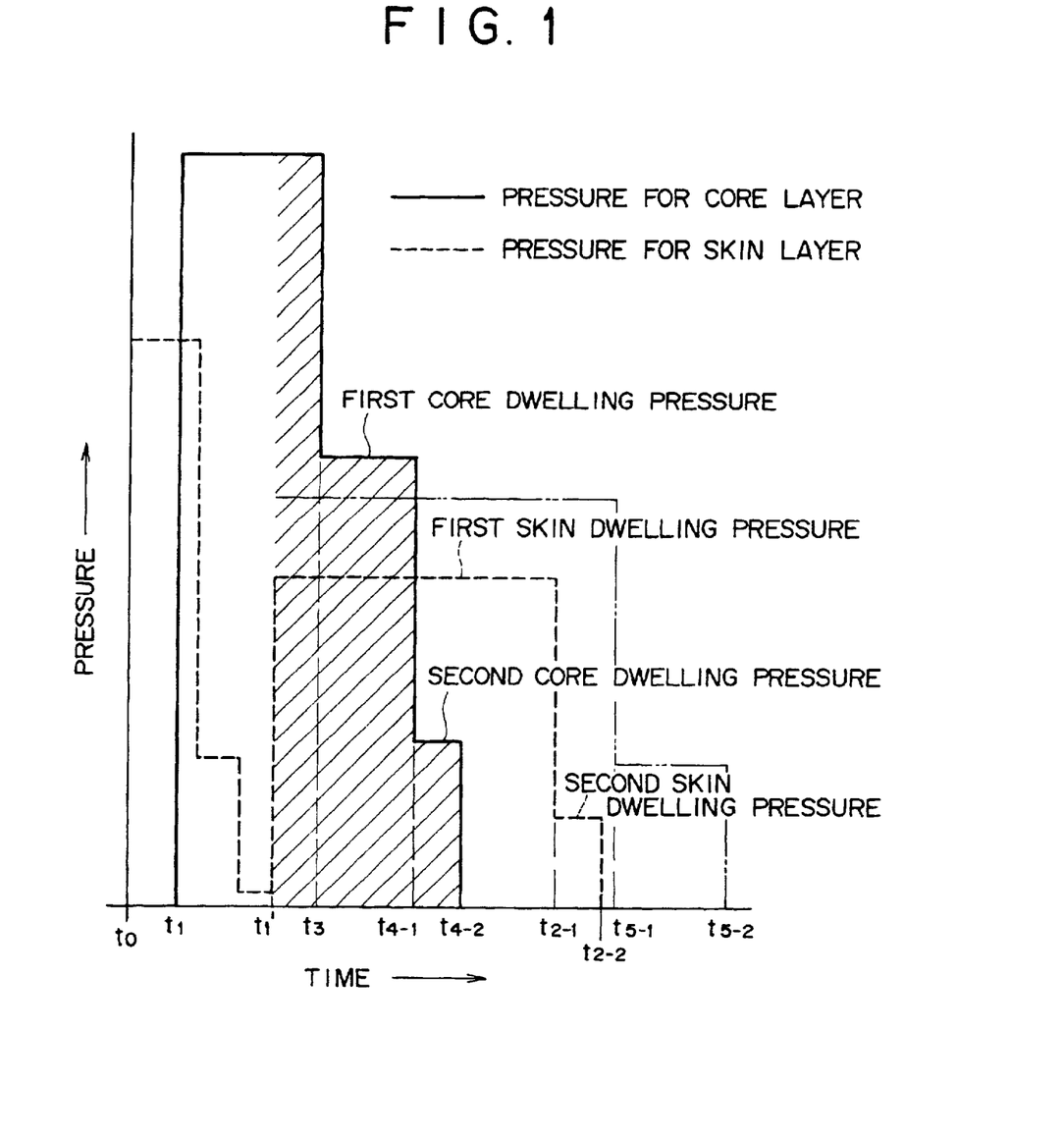
FIG. 1 is a schematic view illustrating the injection operation of a skin layer resin and a core layer resin.

The resin for the core layer (core layer resin) and the resin for the skin layer (skin layer resin) are supplied from a core layer injection unit 12 and a skin layer injection unit 13, respectively. The core layer injection unit 12 is set to a small injection capacity that is about 30% of the injection capacity of the skin injection unit 13. And, the injection operations (injection timing, injection pressure or the like) of these injection units are controlled by a controller not shown in the drawing. That is, as shown in FIG. 1, each injection unit 12, 13 is controlled by the controller to inject the core layer resin with a pressure higher than the injection pressure of the skin layer resin after a predetermined length of time is passed after the injection of the skin layer resin, and to hold the core layer resin with a pressure higher than that of the skin layer resin.

In the injection molding apparatus according to the present invention, the control of injection pressures of the core layer resin and the skin layer resin can be performed by properly using a well-known control means and thus detailed description thereof is omitted.

Said core injection unit 12 is provided on a slide mechanism 14 fixed onto the top surface of the support member 3*b*. In addition, the core injection unit 12 may be disposed vertical to the floor surface as in this embodiment or horizontal to the floor surface. The slide mechanism 14 supports the core layer injection unit 12 to be capable of rising and falling so that the axis of the nozzle part 12*a* of the core layer injection unit 12 is perpendicular to the clamping direction, whereby the nozzle part 12*a* of the core layer injection unit 12 is brought into contact with the side surface of the injection unit connecting device 10 when the resin is supplied into the cavity part 11. On the other hand, the skin layer injection unit 13 is provided on the injection unit loading table 2 to be capable of advancing and retreating so that the axis of the nozzle part 13*a* is parallel to the clamping direction, whereby the nozzle part 13*a* is brought into contact with the front surface of the injection unit connecting device 10 when the resin is supplied into the cavity part 11.

Figure 3:
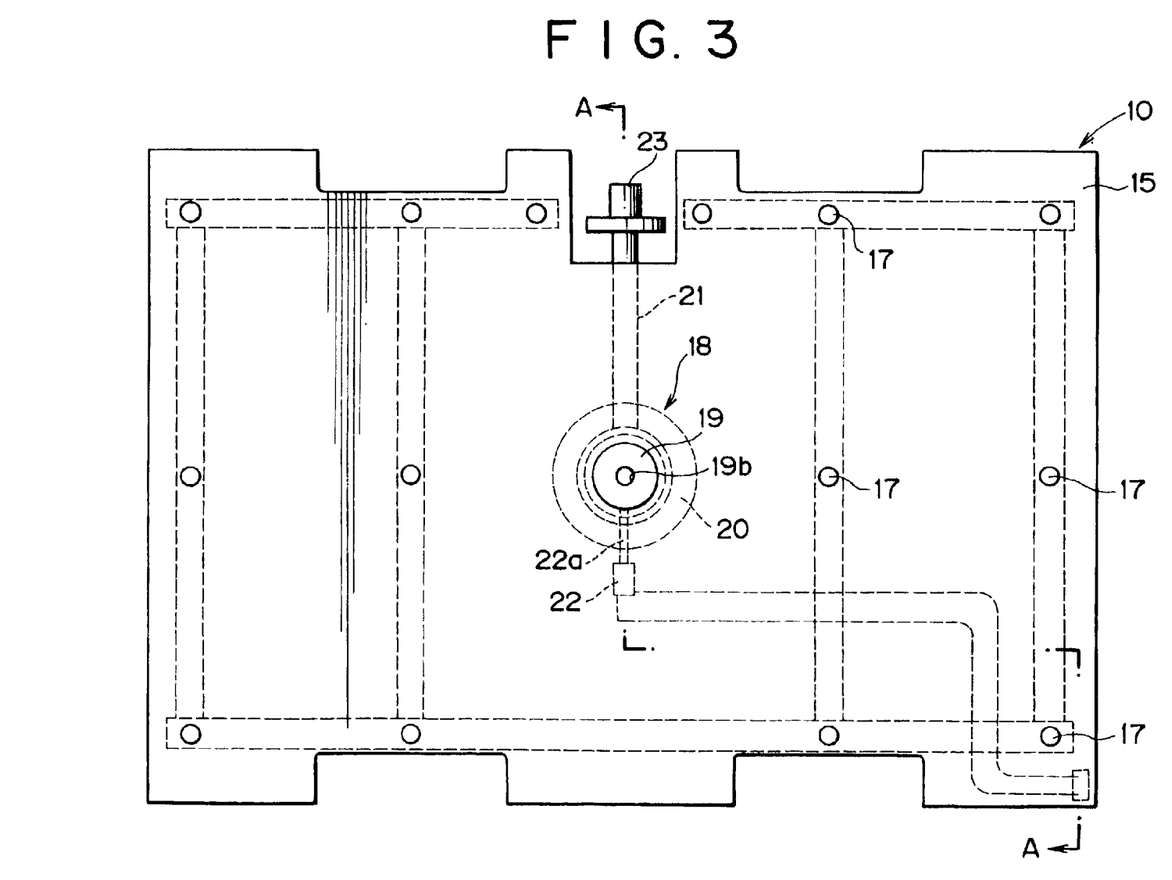
FIG. 3 is a plan view showing the injection unit connecting device.
Figure 4:
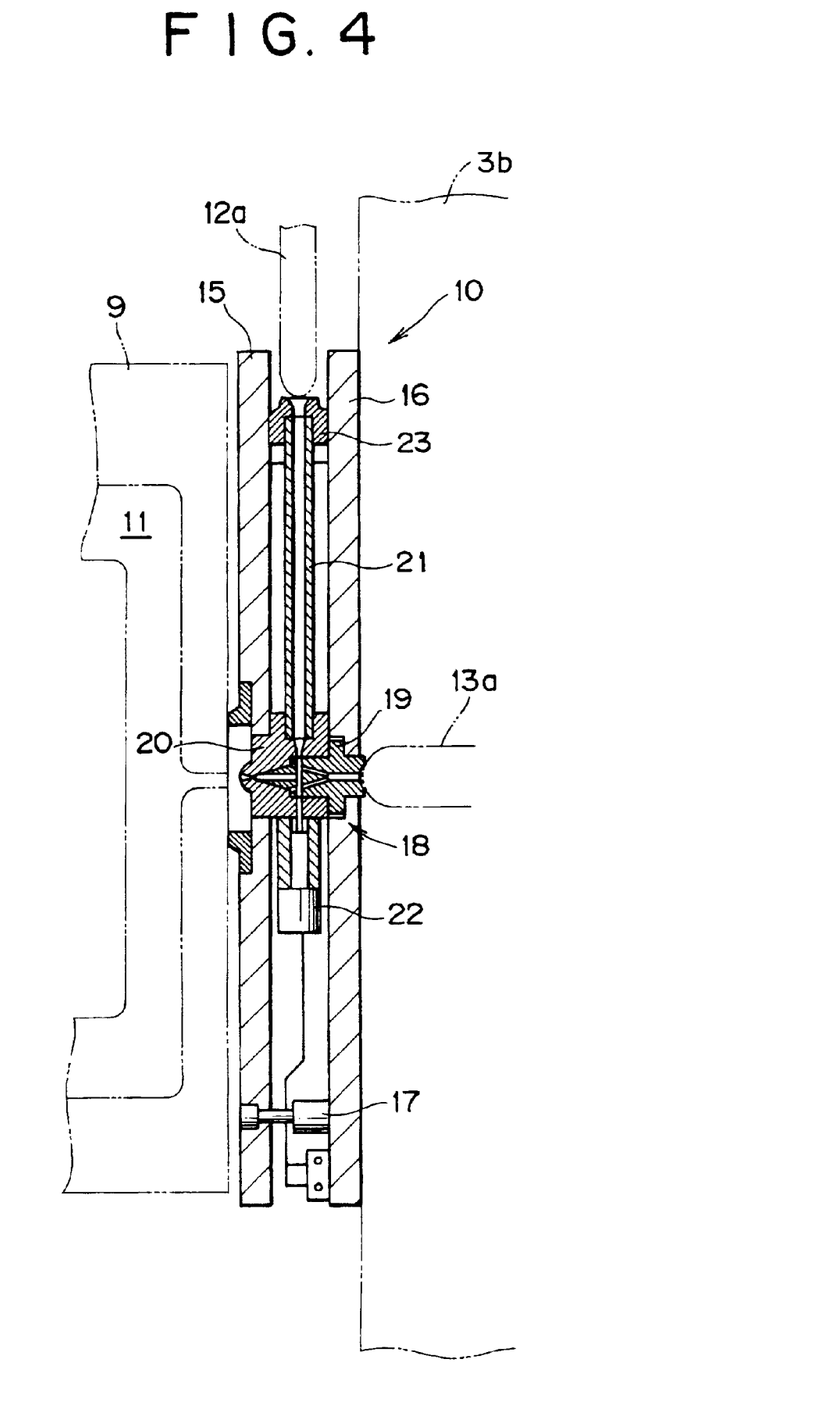
FIG. 4 is a cross-sectional view taken along line A—A of the injection unit connecting device in FIG. 2.

The injection unit connecting device 10, with which the nozzle parts 12*a*, 13*a* are brought into contact, has a metal mold connecting board 15 connected to the stationary metal mold 9, and a fixed board 16 fixed to the support member 3*b*, as shown in FIG. 4. The metal mold connecting board 15 and the fixed board 16 are fastened together by a plurality of bolts 17 to be mutually opposed with a constant space therebetween, as shown in FIG. 3. And, a resin layer forming mechanism 18 for collecting and supplying both of the resins to cover the periphery of the core layer resin with the skin layer resin is provided between the metal mold connecting board 15 and the fixed board 16, as shown in FIG. 4.

Figure 5:
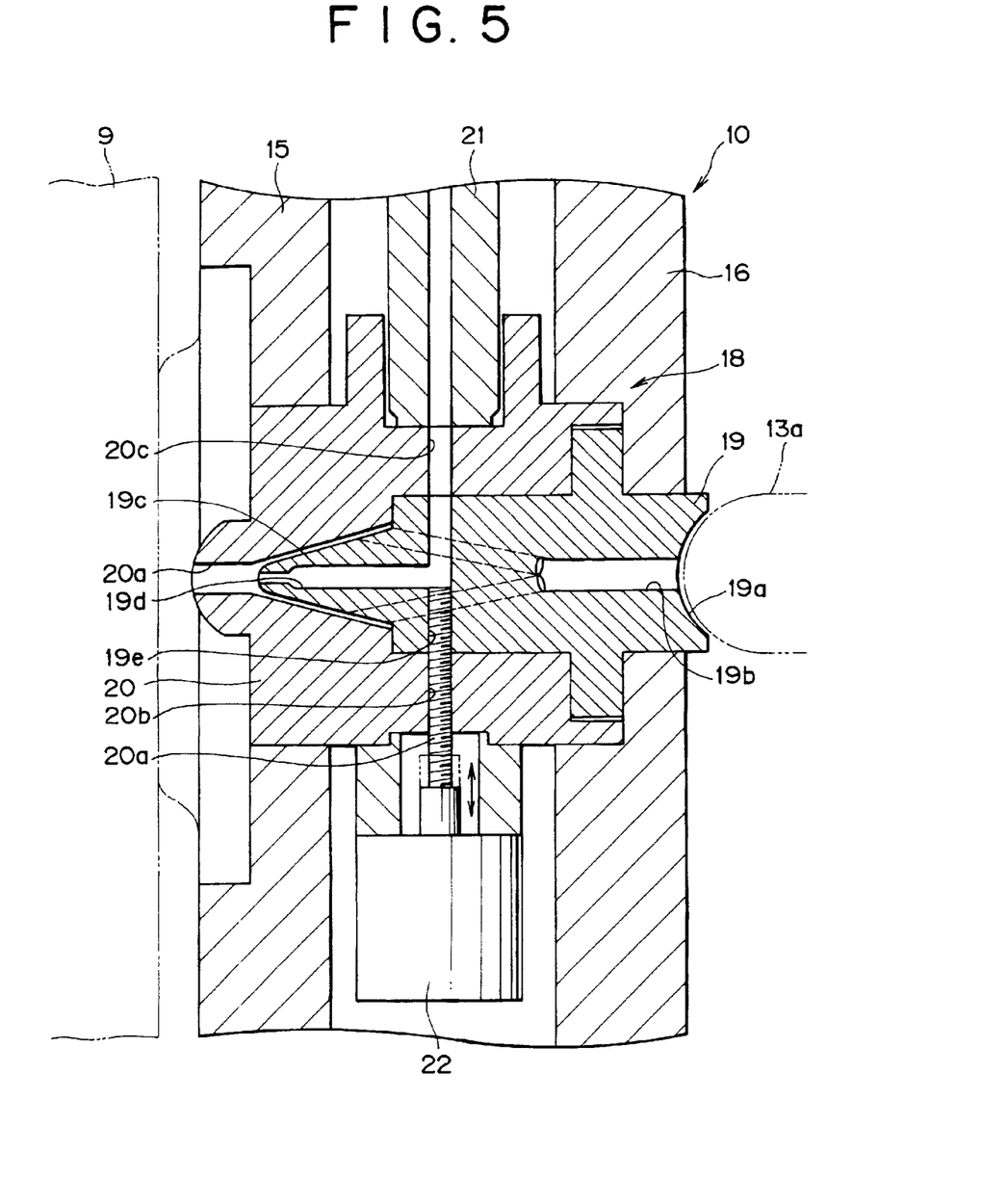
FIG. 5 is an enlarged sectional view of the essential part of the injection unit connecting device.

The resin layer forming mechanism 18 has a male-side laminate member 19, a female-side laminate member 20, a resin guide member 21, and a passage opening and closing member 22, as shown in FIG. 5. The male-side laminate member 19 is provided to pass through the center part of the fixed board 16, and is set so that the tip end makes contact with the nozzle part 13*a* of the skin layer injection unit 13. A recessed curved part 19*a* is formed at the tip end of the male-side laminate member 19 to make face-contact with the tip end of the nozzle part 13*a*, and one end of a skin layer passage 19*b* for conducting the resin from the nozzle part 13*a* is opened to the center part (bottom part) of the recessed curved part 19*a*. The skin layer passage 19*b* is formed in such a manner as to be extended in the axial direction of the male-side laminate member 19, then to be branched in a plurality of directions (for example, four directions) around the axis, and to be opened to a plurality of positions on the other wall surface.

On the other side of the male-side laminate member 19 where the skin layer passage 19*b* is opened to a plurality of positions, a conical inclined protruding part 19*c* is formed. The above-mentioned core layer passage 19*d* is opened to the inclined wall surface of the inclined protruding part 19*c*. One end of a core layer passage 19*d* is opened to the top part of the inclined protruding part 19*c*, and the core layer passage 19*d* is formed in such a manner as to be extended in the axial direction of the male-side laminate member 19 (the inclined protruding part 19*c*), then to be bent at right angle in the center position between the metal mold connecting board 15 and the fixed board 16, to be passed between the branched passages of the skin layer passage 19*b*, and to be opened to the side wall surface. A closed passage 19*e* is allowed to communicate with the bent part of the core layer passage 19*d*, and the closed passage 19*e* is formed in such a manner as to be opened to the sidewall surface opposite to the bending direction of the core layer passage 19*d*.

The male-side laminate member 19 having the above-mentioned structure is fitted into the female-side laminate member 20. The female-side laminate member 20 is provided through the center part of the metal mold connecting board 15, and one end of a core layer passage 20*a* is opened to the tip end of the female-side laminate member 20 at the stationary metal mold 9-side. The core layer passage 20*a* is formed in such a manner as to be extended toward the inclined protruding part 19*c*, then to be increased in aperture so as to keep a constant space with the inclined wall surface of the inclined protruding part 19c, and to be blocked at the end surface of the male-side laminate member 19. Further, one end of the core layer passage 20a and the closed passage 20b is opened to the sidewall surface of the female-side laminate member 20, and the other end of the core layer passage 20a and the closed passage 20b is communicated with the core layer passage 19d and the closed passage 19e of the male-side laminate member 19.

In this manner, the core layer passage 20a, the core layer passage 19d after bending, the closed passage 19e, and the closed passage 20b are allowed to mutually communicate, whereby a linear through-hole is formed extending from the male-side laminate member 19 to the female-side laminate member 20 in a direction perpendicular to the clamping direction.

A tubular resin guide member 21 is fixed to one sidewall surface of the female-side laminate member 20 to communicate with the core layer passage 20c. The resin guide member 21 is formed in such a manner as to be extended from the center part on the side of female-side laminate member 20 to its outer periphery between the metal mold connecting board 15 and the fixed board 16, and an adapter member 23 is provided on the end on the peripheral side. The nozzle part 12a of the core layer injection unit 12 is brought into contact with the adapter member 23.

On the other hand, a passage opening and closing member 22 consisting of, for example, a hydraulic cylinder is provided on the other sidewall surface of the female-side laminate member 20. The passage opening and closing member 22 has a blocking member 22a capable of advancing and retreating, as shown in FIG. 5, and the block member 22a is inserted into the closed passages 20b, 19e in a liquid-tight state. The passage opening and closing member 22 places the core layer passage 19d in the blocked state in the bent part by advancing the blocking member 22a, while placing the core layer passage 19d in the opened state by retreating the block member 22a. The tip end of the blocking member 22a has a curved surface corresponding to the bent radius of the core layer passage 19d, so that the flowing resistance of the resin in the bent part is reduced when the core layer passage 19d is placed in the opened state.

The injection molding method of this embodiment will be explained by way of the operation of the multi-layer injection molding machine in the above-mentioned structure.

Firstly, as shown in FIG. 2, the core layer resin and the skin layer resin made of thermoplastic resin are put into hoppers not shown of the core injection unit 12 and the skin injection unit 13, respectively. It is also preferred to select the materials of the core layer resin and the skin layer resin that have compatibility. Specifically, as shown in Table 1, it is preferred that they are the same materials but they may be combinations of "○" marked.

TABLE 1

|        | ABS | ASA | CA | EVA | PA6 | PA66 | PC | HD-PE | LD-PE | PMMA | POM | PP | modPPO |
|--------|-----|-----|-----|-----|-----|------|-----|-------|-------|------|-----|-----|--------|
| ABS    | ○ | ○ | ○ | — | — | — | ○ | — | — | ○ | — | — | — |
| ASA    | ○ | ○ | ○ | ○ | — | — | ○ | — | — | ○ | — | — | — |
| CA     | ○ | ○ | ○ | Δ | — | — | — | — | — | — | — | — | — |
| EVA    | — | ○ | — | ○ | — | — | — | ○ | ○ | — | — | ○ | — |
| PA6    | — | — | — | — | ○ | ○ | — | Δ | Δ | — | — | Δ | — |
| PA66   | — | — | — | — | ○ | ○ | Δ | Δ | Δ | — | — | Δ | — |
| PC     | ○ | ○ | — | — | — | Δ | ○ | — | — | — | — | — | — |
| HD-PE  | — | — | — | ○ | Δ | Δ | — | ○ | ○ | Δ | Δ | — | — |
| LD-PE  | — | — | — | ○ | Δ | Δ | — | ○ | ○ | Δ | Δ | ○ | — |
| PMMA   | ○ | ○ | — | — | — | — | — | Δ | Δ | ○ | — | Δ | — |
| POM    | — | — | — | — | — | — | — | Δ | Δ | — | ○ | Δ | — |
| PP     | — | — | — | ○ | Δ | Δ | — | — | ○ | Δ | Δ | ○ | Δ |
| modPPO | — | — | — | — | — | — | — | — | — | — | — | Δ | ○ |
| GP-PS  | — | — | — | ○ | — | — | — | — | — | — | — | — | ○ |
| HI-PS  | — | — | — | — | — | — | — | — | — | — | — | — | ○ |
| PBT    | ○ | ○ | ○ | — | — | — | ○ | — | — | — | — | — | — |
| TPU    | ○ | ○ | ○ | — | ○ | ○ | ○ | — | — | — | — | — | — |
| PVC    | ○ | ○ | ○ | — | — | — | ○ | Δ | — | ○ | — | Δ | — |
| SAN    | ○ | ○ | ○ | — | — | — | ○ | — | — | ○ | — | — | — |
| TPR    | — | — | — | — | — | — | — | — | — | — | — | ○ | — |
| PET    | ○ | — | — | — | — | — | ○ | — | — | — | — | — | — |
| PVAC   | Δ | Δ | — | — | — | — | — | — | — | — | — | — | — |
| PPS    | — | — | — | — | — | — | ○ | — | — | — | — | — | — |
| PC/PBT | ○ | ○ | — | — | — | — | ○ | — | — | — | — | — | — |
| PC/ABS | ○ | ○ | — | — | — | — | ○ | — | — | — | — | — | — |

|        | GP-PS | HI-PS | PBT | TPU | PVC | SAN | TPR | PET | PVAC | PPS | PC/PBT | PC/ABS |
|--------|-------|-------|-----|-----|-----|-----|-----|-----|------|-----|--------|--------|
| ABS    | — | — | ○ | ○ | ○ | ○ | — | ○ | Δ | — | ○ | ○ |
| ASA    | — | — | ○ | ○ | ○ | ○ | — | — | Δ | — | ○ | ○ |
| CA     | — | — | ○ | ○ | ○ | ○ | — | — | — | — | — | — |
| EVA    | ○ | — | — | — | — | — | — | — | — | — | — | — |
| PA6    | — | — | ○ | — | — | — | — | — | — | — | — | — |
| PA66   | — | — | ○ | — | — | — | — | — | — | — | — | — |
| PC     | — | — | ○ | ○ | ○ | ○ | — | ○ | — | ○ | ○ | ○ |
| HD-PE  | — | — | — | — | Δ | — | — | — | — | — | — | — |
| LD-PE  | — | — | — | — | — | — | — | — | — | — | — | — |
| PMMA   | — | — | — | — | ○ | ○ | — | — | — | — | — | — |
| POM    | — | — | — | — | — | — | — | — | — | — | — | — |
| PP     | — | — | — | — | Δ | — | ○ | — | — | — | — | — |
| modPPO | ○ | ○ | — | — | — | — | — | — | — | — | — | — |
| GP-PS  | ○ | ○ | — | — | Δ | — | — | — | — | — | — | — |
| HI-PS  | ○ | ○ | — | — | Δ | — | — | — | — | — | — | — |

TABLE 1-continued

| | | | | | | | | | | | | |
|---|---|---|---|---|---|---|---|---|---|---|---|---|
| PBT | — | — | ○ | ○ | ○ | ○ | | | | | | |
| TPU | — | — | ○ | ○ | ○ | ○ | | | | | | |
| PVC | △ | △ | ○ | ○ | ○ | ○ | | | | | ○ | |
| SAN | — | — | ○ | ○ | ○ | ○ | | ○ | △ | | ○ | ○ |
| TPR | | | | | | | ○ | | | | | |
| PET | | | | | | | | ○ | ○ | | ○ | ○ |
| PVAC | | | | | | | | △ | | ○ | | |
| PPS | | | | | | | | | | ○ | | |
| PC/PBT | — | — | | | | | | ○ | ○ | | ○ | |
| PC/ABS | — | — | | | ○ | ○ | | ○ | | | | ○ |

○: good adhesion
△: insufficient adhesion
—: non-adhesion

Thereafter, as the nozzle parts 12a, 13a of the core layer injection unit 12 and the skin layer injection unit 13 are brought into contact with the adapter member 23 and the male-side laminate member 19, respectively, as shown in FIG. 5, the preparation of injection molding is completed. When the start of injection molding is instructed by pressing a molding start button or the like not shown, each of the injection units 12, 13 controlled by a control device not shown injects the skin layer resin and the core layer resin to form a molded product having a desired shape by performing the injection operation of FIG. 1. In FIG. 1, the injection operation of the skin injection unit is indicated by dotted lines and the injection operation of the core injection unit 12 is indicated by solid lines.

Specifically, the movable metal mold 8 is moved toward the stationary metal mold 9 by the metal mold opening and closing cylinder 5, and presses the movable metal mold 8 against the stationary metal mold 9 with a predetermined pressing force to clamp them as shown in FIG. 2. When the cavity part 11 is formed within the metal molds 8, 9 by clamping, the skin layer resin is filled into the skin layer injection unit 13 having a large injection capacity capable of directly charging the resin into the cavity part 11 and heated, and the skin layer resin converted into the fused state is injected prior to the core layer resin.

The skin layer resin flows into the skin layer passage 19b of the mail-side laminate member 19 in the injection unit connecting device 10 through the nozzle part 13a, and advances while being branched in a plurality of directions in the skin layer passage 19b, as shown in FIG. 5. And, the skin layer resin further advances in the skin layer passage 19b, where it flows out to the clearance between the inclined protruding part 19c of the male-side laminate member 19 and the core layer passage 20a of the female-side laminate member 20, flows toward the stationary metal mold 9 while completely covering the inclined wall surface of the inclined protruding part 19c, and then flows into the cavity part 11 within the metal molds 8, 9.

Next, the blocking member 22a of the passage opening and closing member 22 is retreated when a predetermined waiting time $t_1$ is passed after the injection of skin layer resin, whereby the core layer passage 19d is placed in the opened state. And, the core layer resin including a thermosetting resin is filled into the core layer injection unit 12 and heated, and the core layer resin converted into the fused state is injected with the pressure higher than the injection pressure of the skin layer resin in order to compensate the volumetrically reduced quantity at the time of cooling and solidification of the skin layer resin. It is preferred to precisely use the core layer resin in a required minimum amount less than the amount of the skin layer resin to be injected, in order to suppress the increase of weight of the molded products and cost of material.

The core layer resin flows into the core layer passages 20a, 19d of the female-side laminate member 20 and the male-side laminate member 19 through the resin guide member 21, and flows out from the tip end of the inclined protruding part 19c after the advancing direction is turned by the blocking member 22a. At this time, the skin layer resin discharged in advance is collected in the top part of the inclined protruding part 19c along the inclined wall surface of the inclined protruding part 19c. Thus, the core layer resin flowing out through the tip end of the inclined protruding part 19c is passed through the core layer passage 20a together with the skin layer resin while its periphery is completely covered with the skin layer resin, and press-fitted into the cavity part 11 of the stationary metal mold 9.

Thereafter, in the skin injection unit 13, the injection pressure of the skin layer resin is reduced step by step and then raised to increase the pressure within the cavity part 11 to the first dwelling pressure, and after a predetermined cooling time $t_2$ is passed, the first skin dwelling pressure is reduced step by step to the second skin dwelling pressure and the injection is terminated. On the other hand, in the core injection unit 12, the high pressure at the initial period of injection is maintained until a predetermined time $t_3$ is passed after the skin layer resin is converted into the first skin dwelling pressure, and the injection pressure is reduced step by step before the cooling time $t_2$ is passed, whereby the injection is terminated while reducing step by step to the first core dwelling pressure which is higher than the first skin dwelling pressure, and to the second core dwelling pressure which is higher than the second skin dwelling pressure.

Figure 6:
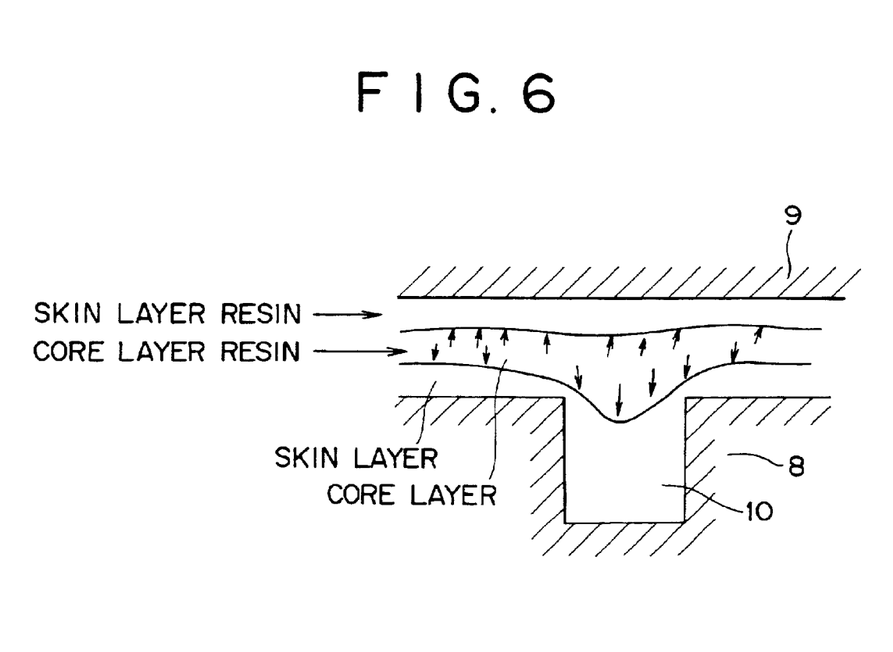
FIG. 6 is a schematic view illustrating the state of the skin layer resin and the core layer resin.

If the skin layer resin and the core layer skin are injected into the cavity part 11 as described above, the skin layer resin contacting with the metal molds 8, 9 are cooled and thus solidified while being subjected to volumetric reduction, as shown in FIG. 6. At this time, the core layer skin having a pressure higher than the injection pressure of the skin layer resin as explained in the above is existent in the fused state within the solidified skin layer resin. Therefore, even if the volumetric reduction of the skin layer resin is applied to decrease the pressure of the inner part of the molded product surrounded by the skin layer resin in the solidified state, the core layer resin existent in the inner part of the molded product compensates the reduced pressure part, whereby the inner part of the molded product is not placed in negative pressure. In other words, the skin layer resin is forcedly compressed against the surfaces of the metal molds by the pressure of the core layer resin, whereby sink marks are avoided. As a result, when the skin layer resin and the core layer resin are cooled and solidified and the molded product is obtained, hollows and sink marks are not generated in the molded product.

In addition, the core injection unit 12, shown in FIG. 2, for injecting the core layer resin is set to a small injection capacity which is equal to or less than, typically 30% of the injection capacity of the skin injection unit 13. Therefore, the core layer resin injected from the core injection unit 12 is precisely charged in a required minimum amount which does not generate hollows or sink marks in the molded product, whereby the increase of weight of molded product and the increase of material cost caused by the weight increase are sufficiently suppressed.

Thereafter, if one cycle of injection molding is completed in the above manner, the blocking member 22a of the passage opening and closing member 22 is advanced as shown in FIG. 5 whereby the core layer passage 19d is blocked and placed in the standby state. And, when the start of next injection molding is instructed, a series of the above operations will be repeated again.

In FIG. 1, the start and termination of solidification of the skin layer resin and the core layer resin are proceeded as follows: In the injection molding, a metal mold is generally placed in the cooled state and the surface of the skin layer resin contacted with the metal mold begins to be solidified from the time $t_0$ at which the injection is started. However, the problem considered in the present invention is not the cooling and solidification at the surface contacted with the metal mold but the solidification within the layer. It is believed that the solidification within the layer has already begun at the time of $t_1'$ of FIG. 1 and is completed at the time of $t_{2-2}$. The solidification of the core layer is believed to begin near about the time $t_3$ and to terminate near the time of $t_{2-2}$. Therefore, even if the volumetric reduction of the skin layer resin functions to decrease the pressure of the inner part surrounded by the solidified skin layer resin, the compensating action of the core layer resin existent in the inner part of the molded product for compensating the pressure decreased part is continued to the time, $t_{4-1}$ of FIG. 1.

In the embodiment of FIG. 1, although the set pressure for skin is decreased to near zero and then increased to the first skin dwelling pressure, it is not necessary to perform in this pattern. For example, the initial injection may be directly switched over to the first skin dwelling pressure. The important thing is that the state the value of core layer dwelling pressure is maintained higher than said skin layer dwelling pressure is existent over a required length of time, and the pattern until the initial injection is switched over to the first skin dwelling pressure is appropriately determined depending on a condition such as the object to be molded or the like.

Although a time band in which the first skin dwelling pressure is greater than the second core dwelling pressure, the set pressure for skin equals the first skin dwelling pressure and the set pressure for core equals the second core dwelling pressure is existent between $t_3$ and $t_2$ in the embodiment of FIG. 1, it is not always necessary to set such a time band. It is sufficient if the changing patterns of set pressures for the skin and core is appropriately determined depending on the condition such as an object to be molded or the like, after maintaining the state that said core layer dwelling pressure is higher than said skin dwelling pressure over a required length of time.

Although the core dwelling pressure is set to zero before the skin dwelling pressure is set to zero in the embodiment of FIG. 1, it is possible to set the skin dwelling pressure to zero before the core dwelling pressure is set to zero, to the contrary. If it is required to completely cover the molded product with the skin layer resin, the core dwelling pressure is set to zero before the skin dwelling pressure is set to zero. If the core layer resin is intended to appear in the surface, the skin dwelling pressure is set to zero before the core dwelling pressure is set to zero. In this manner, it may be appropriately determined according to the specification of molded product.

The injection molding method of this embodiment can be applied either to produce a molded product formed from a transparent material such as polycarbonate, acryl resin or the like or to produce a compact disc (CD), in addition to being applicable to produce a part for automobile. In particular, the generation of distortion can be avoided in the case of the molded product formed form a transparent material, and the complex refractive index can be improved in the case of the CD.

Next, molded products were made by the injection molding method of this embodiment and by the method performing the injection and compensation of resin with one injection unit as in the prior art, respectively, and the conditions thereof were investigated.

Specifically, an injection molding machine with an injection capacity of 140 ounces was used as the skin injection unit 13 and an injection molding machine with an injection capacity of 47 ounces was used as the core injection unit 12. The cylinder temperatures of the skin injection unit 13 were set to 170° C., 180° C., 220° C. and 230° C. form the hopper side, the cylinder temperatures of the core injection molding unit 12 were set to 210° C., 210° C., 210° C. and 230° C. form the hopper side, and the skin layer resin and the core layer resin were injected, respectively, with the injection timings and pressures indicated in FIG. 1. That is, when the skin layer resin was injected 80% after the start of injection, the core layer resin was injected with an injection pressure higher than the injection pressure by about 25%, and after the completion of injection of the core layer resin. The dwelling pressure was reduced step by step.

As a result, it was confirmed that according to the injection molding method of this embodiment it is possible to make molded products of 4900 g–4950 g for the design weight of 5000 g including an amount to be supplemented. It was also confirmed that sink marks and burr were not generated in the molded products.

Next, molded products were made by continuously compensating the volumetrically reduced quantity with the injection unit after performing the injection of resin in the injection unit as shown in phantom line in FIG. 1. In this case, it was founded that if the dwelling pressure and the time for maintaining the dwelling pressure are set to be increased by 20%, the sink marks in the molded products can be avoided within the quality limit. In this case, however, it was also confirmed that the weight increase of about 250 g (about 5%) is generated for the above design weight of 5000 g and burr is produced in the molded products.

What is claimed is:

1. An injection molding method for obtaining a molded product consisting of a skin layer and a core layer by injecting a skin layer resin and a core layer resin from a skin injection unit and a core injection unit respectively into a metal mold, comprising the steps of:

injecting said skin layer resin from said skin injection unit into said metal mold, wherein the value of injection pressure is a predetermined value of the initial skin layer injection pressure;

injecting said core layer resin from said core injection unit into said metal mold after a predetermined length of time is passed from the start of injection of said skin layer resin, wherein the value of injection pressure is a predetermined value of the initial core layer injection pressure and said initial core layer injection pressure value is greater than the value of said initial skin layer injection pressure;

changing said skin layer resin injection pressure to a predetermined value of the skin layer dwelling pressure after a predetermined length of time is passed from the start of injection of said core layer resin, wherein the value of said skin layer dwelling pressure is smaller than the value of said initial skin layer injection pressure;

changing said core layer resin injection pressure to a predetermined value of the core layer resin dwelling pressure after a predetermined length of time is passed from the time that the said skin layer resin injection pressure turns to the value of said skin layer dwelling pressure, wherein the said core layer dwelling pressure is smaller than the value of said initial core layer injection pressure and greater than the value of said skin layer dwelling pressure; and maintaining the state that the value of said core layer dwelling pressure is greater than the value of said skin layer dwelling pressure over a predetermined length of time.

2. An injection molding method according to claim 1, wherein the injection capacity of said core injection unit is equal to or less than the injection capacity of said skin injection unit.

3. The injection molding method according to claim 2, wherein the amount of said core layer resin to be injected is smaller than the amount of said skin layer resin to be injected.

4. The injection molding method according to claim 1, wherein the value of the skin resin injection pressure by said skin injection unit is reduced step by step after the start of injection of said core layer resin from said core injection unit into said metal mold.

5. The injection molding method according to claim 4, wherein the value of said skin resin injection pressure by said skin injection unit is set to a value of pressure smaller than the value of said skin layer dwelling pressure before it is changed to the value of said skin layer dwelling pressure.

6. The injection molding method according to claim 1, at least one of the value of said core layer resin injection pressure and the value of said skin layer resin injection pressure is reduced step by step after the state that the value of said core layer dwelling pressure is larger than the value of said skin layer dwelling pressure is maintained over the predetermined length of time.

7. The injection molding method according to claim 1, wherein the value of said initial core layer injection pressure is set larger than the value of said initial skin layer injection pressure to be sufficient for compensating the volumetrically reduced quantity of said skin layer resin at the time of cooling and solidification.

8. The injection molding method according to claim 1, wherein the value of said core layer dwelling pressure is set larger than the value of said skin layer dwelling pressure to be sufficient for compensating the volumetrically reduced quantity at the time of cooling and solidification of said skin layer resin.

9. The injection molding method according to claim 1, wherein the value of said initial core layer injection pressure is set larger than the value of said initial skin layer injection pressure and the value of said core layer dwelling pressure is set larger than the value of said skin layer dwelling pressure, respectively, to be sufficient for compensating the volumetrically reduced quantity at the time of cooling and solidification of said skin layer resin.

10. The injection molding method according to claim 1, wherein said core layer resin and said skin layer resin is homogeneous or have compatibility while being heterogeneous.

11. A molded product formed by the injection molding method of claim 1.

* * * * *